Patented Nov. 9, 1943

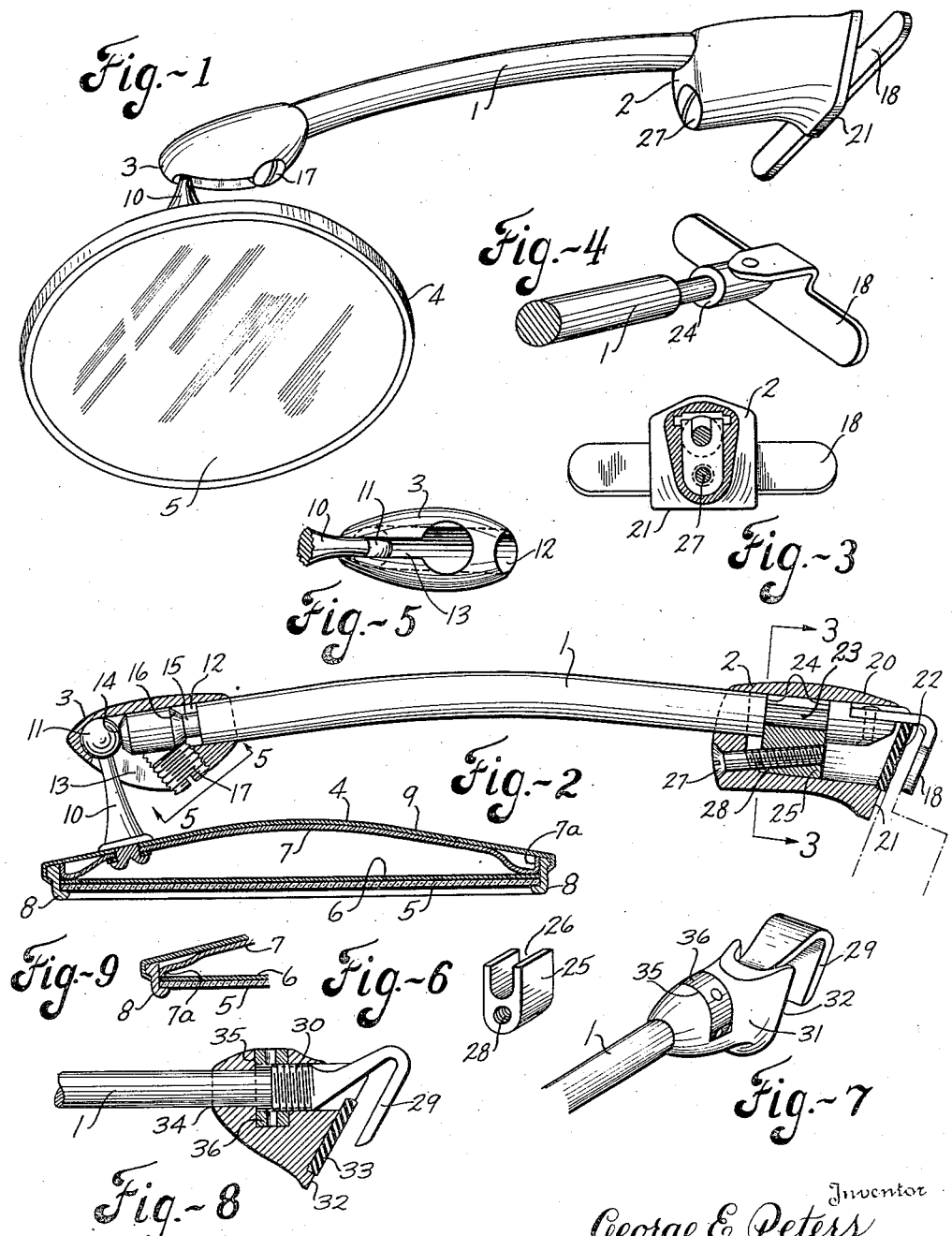

2,333,671

UNITED STATES PATENT OFFICE 2,333,671

REARVIEW MIRROR

George E. Peters and Linus E. Russell, Springfield, Ohio, assignors to Peters & Russell, Inc., Springfield, Ohio, a corporation of Ohio Application September 13, 1940, Serial No. 356,678

11 Claims. (Cl. 248—226)

This invention pertains to rear view mirror for vehicles, and more particularly to mountings therefor of the outrigger type wherein the mirror is adjustably carried on an arm projecting outside the vehicle.

In the present instance there is contemplated a mirror eccentrically mounted for universal adjustment upon the extremity of a mounting arm having at its inner end a clamp head by which the arm is detachably engageable with the margin of a vehicle door or with the frame of a window or other supporting portion of the vehicle.

The object of the invention is to improve the construction as well as the means and mode of mounting rear view mirrors, whereby they may not only be economically manufactured, but will be more efficient in use, of sturdy and durable construction, capable of securely maintaining their adjusted position, having relatively few parts, which are readily accessible, and unlikely to get out of repair.

A further object of the invention is to provide an improved assembly of the mirror head by which the mirror glass is securely held in its housing against vibration or movement and which will withstand vibration of the vehicle without breakage.

A further object of the invention is to provide an improved form of universal coupling of the mirror head with its supporting arm, and means for securely locking the universal coupling in its adjusted condition.

A further object of the invention is to provide an improved clamp head for detachably securing the mounting arm to the vehicle body.

A further object of the invention is to provide an improved form of assembly of a universally mounted mirror or the like and its support.

A further object of the invention is to provide an improved means and method of adjusting the clamping head of the support.

A further object of the invention is to provide a mirror support having the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing, wherein is shown the preferred, but obviously not necessarily the only forms of embodiment of the invention, Fig. 1 is a perspective view of an assembled rear view mirror and its mount embodying the present invention. Fig. 2 is a top plan view, partly in section thereof. Fig. 3 is a transverse sectional view of the clamp head of the mount taken on line 3—3 of Fig. 2. Fig. 4 is a detail perspective view of the support engaging end of the mount arm. Fig. 5 is a detail view of the socket fitting removed from the supporting arm and viewed in the plane 5—5 of Fig. 2. Fig. 6 is a detail perspective view of the adjusting nut of the clamp head. Fig. 7 is a perspective view of a modified form of the clamp head of the mount. Fig. 8 is a side elevation thereof partly in section. Fig. 9 is a cross-sectional view showing a modified construction of the mirror unit.

Like parts are indicated by similar characters of reference throughout the several views.

The present mount comprises an outrigger arm having a clamp head at one end for engagement with a supporting structure and a universal coupling at the other end. It may be made in various sizes and used for supporting articles other than rear view mirrors.

While especially desirable as a rear view mirror support, it is to be understood that it is not limited to such application and that the herein disclosure and description of the mount as applied to such purpose is with no intent of unduly limiting either the scope or application of the invention.

The present device includes an arm 1 having at one end a clamp head 2 for supporting engagement with the flange of an automobile door, window frame, or other structure. At its opposite end is a universal coupling 3 with which is adjustably engaged a mirror unit 4.

The mirror unit includes a silvered reflector glass 5 having a backing disc 6 of card board, felt or the like. It is subjected to the pressure of a concave tensioned disc 7. The several parts are surrounded by an annular mounting ring or rim 8, which is preferably of molded thermo-plastic material. The rim is peripherally engaged by a concave housing 9 which confines the concave disc 7 under pressure exerted against the backing 6 and reflector 5 to enable the latter to withstand road shock and vibration.

The margin 7a of the pressure disc 7 is shown rearwardly flanged in Fig. 2, but in reverse relation in the detail view, Fig. 9, wherein the marginal edge of the disc is shown abutting on the backing disc and reflector.

Projecting in eccentric relation from the back of the mirror unit is a stem 10 secured by staking or riveting the inner end thereof through registering holes in the housing 9 and tension disc 7. The stem 10 carries a ball head 11 at its outer extremity which forms a part of a universal or ball and socket joint of the coupling 3.

The coupling 3 has therein a longitudinal bore 12 within which the extremity of the arm 1 has thrust engagement. Intersecting the bore 12 in diagonally inclined relation to the axis thereof is a keyhole slot 13. The eye of the keyhole slot 13 is of sufficient size to permit the ball head 11 of the mirror stem 10 to be inserted therethrough into the bore 12. The stem 10 is then moved through the elongation of the keyhole slot 13 until the ball 11 is seated in the end of the bore, which is of semi-spherical form, affording a seat or socket. The ball head 11 is held in its semi-spherical seat in the end of the bore by the abutment thereon of the terminal face 14 of the arm 1. The stem 10 is of sufficiently small diameter that it may be rotated within the slot, thereby rotating the ball head in its socket. The stem also may be oscillated to and fro in the slot 13 in any position of revoluble adjustment. Thus there is afforded a universal or ball and socket connection which enables the mirror to be turned in various directions through a wide range of adjustment.

To lock the parts in their adjusted position, the arm 1 is provided with a peripheral groove 15, affording a tapered shoulder 16 opposite the eye of the keyhole slot 13. Screw threaded in the eye of said keyhole slot is a screw plug 17, the inner end of which bears against the shoulder 16 of the arm 1. As the plug is tightened, it exerts a thrust pressure on the shoulder 16 of the arm, which tends to move the arm axially within the bore 12, thereby transmitting thrust clamping pressure of the end of the arm 1 against the ball head 11.

At its support engaging end the arm 1 is provided with a cross-head 18 having a flat face disposed in a plane somewhat divergent to the axis of the arm. The cross-head 18 may be formed integral with the arm 1, but in the drawing is shown as separately formed and attached to the arm by a rivet. Mounted on the arm 1 for reciprocatory motion toward and from the cross-head 18 is a sleeve 20, the end of which, adjacent to the cross-head, is expanded at 21 to afford a bearing face opposite the cross-head 18, which is recessed to receive a rubber or other resilient pad 22. The contiguous faces of the cross-head 18 and sleeve 20 are approximately parallel, but preferably slightly convergent, whereby under gripping pressure they tend to approach parallel relation.

The sleeve 20 is adjustable axially of the arm 1 into clamping engagement with a support interposed between the terminal bearing portion 21 and pad 22 of the sleeve and the cross-head 18 of the arm. To effect such clamping adjustment the arm 1 is peripherally reduced at 23 interiorly of the sleeve 20.

Engaging within such reduced portion and abutting the shoulders 24 at each end thereof is a laterally slotted or bifurcated nut 25 located within the sleeve 20 with its slotted margin 26 straddling the reduced neck of the arm 1. An adjusting screw 27 extends through the terminal wall of the sleeve 20 in offset relation with the arm 1 and has engagement in a screw threaded opening 28 in the nut 25. By adjustment of the screw 27, the sleeve 20 is adjusted axially of the arm 1 to effect clamping engagement of a door flange or other supporting structure interposed between the portion 21 of the sleeve and the cross-head 18.

As a variation of the clamp head structure described, there is illustrated in Figs. 7 and 8 a hook-shaped head 29 formed integrally with the arm 1. The arm 1 is screw threaded at 30 adjacent to the hook-shaped head 29. Mounted on the arm for to and fro axial movement toward and from the head 29 is a sleeve 31 having a bearing face 32 inclined to the axis of the arm, in which is inset a resilient pad 33. The arm 1, including the screw threaded portion thereof, extends through a bore 34 in the sleeve 31, which is intersected by a transverse slot 35. Located within the slot 35 and having screw threaded engagement with the portion 30 of the arm 1 is a revoluble collar 36, by rotation of which the sleeve 31 is adjusted toward and away from the head 29 to grip a support interposed therebetween. The collar 36 is adapted to be tightened by a spanner wrench, for the engagement of which radial holes are provided in the periphery of the collar.

In the primary construction illustrated in Figs. 1 and 2, the coupling sleeve 3 is capable of revoluble adjustment as well as axial adjustment relative to the arm, when the clamp screw 17 is relaxed. This enables the article stem 10 to be oscillated in transverse planes parallel with the axis of the arm and perpendicular thereto, and also permits its revoluble adjustment in any position of such oscillatory adjustment. Being eccentrically positioned upon the mirror or other article, the latter is afforded an extremely wide range of adjustment.

From the above description it will be apparent that there is thus provided a device of the character described possessing the particular features of advantage before enumerated as desirable, but which obviously is susceptible of modification of parts without departing from the principle involved or sacrificing any of its advantages.

While in order to comply with the statute the invention has been described in language more or less specific as to structural features, it is to be understood that the invention is not limited to the specific features shown; but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A support of the type wherein an article is supported for universal adjustment in spaced relation with a main supporting body, comprising an outrigger supporting arm engageable with a main supporting body, a socket member on the free end of the arm having a bore therein closed at one end within which the end of the arm extends for relative axial adjustment, a keyhole slot intersecting the bore, a spherical headed, adjustable supporting stem for an article, the head of which is projected through the eye of the keyhole slot and the stem adjustably extended through the restricted portion of the keyhole slot for adjustment therein, the head of said stem being seated in the closed end of the bore and subjected to thrust engagement of the end of the arm therein, and a screw plug in the eye of the keyhole slot engaging with the arm to maintain the stem under thrust clamping pressure.

2. A universally adjustable mirror unit wherein an outrigger supporting arm is provided with clamp means at one end for detachable engagement with a portion of a vehicle body to support the arm in extended position, a socket fitting having a bore therein closed at one end within which the end of the arm projects for relative axial adjustment, a slot in the socket fitting, a ball head stem carried by the mirror unit, the ball head of which is seated in the closed end of the bore and the stem of which projects therefrom through the slot, and a set screw for exerting axial thrust pressure of the end of the arm upon the ball head of the stem to hold the mirror unit in its adjusted position.

3. A rear view mirror wherein a mirror unit having a ball head stem eccentrically carried thereby for universal adjustment thereof is supported by an outrigger arm provided with a clamp head at one end thereof for detachable engagement with a portion of a vehicle body, a socket fitting having a bore therein into which the free end of the arm projects for relative axial adjustment of the socket fitting and arm, a socket for the ball head of the mirror stem in the end of said bore, a keyhole slot in the side of the socket fitting diagonally intersecting the bore thereof, the eye of said keyhole slot being of sufficient size to permit the insertion of the ball head of the mirror stem therethrough into the bore, the elongation of the keyhole slot being of sufficient size to permit to and fro and rotary motion of the mirror stem while the ball head thereof is confined within the fitting bore, a screw plug adjustable in the eye of the keyhole slot, and a shoulder on the arm engaged by the screw plug to impart axial thrust pressure of the end of the arm upon the ball head of the mirror stem by adjustment of the screw plug.

4. In a mounting of the character described wherein a supporting arm is provided with a clamp head at one end thereof for detachable engagement with a support, a universal coupling at the other end of the arm connecting a supported article with the arm for adjustment to various relative positions, said universal joint including a socket member having a bore therein closed at one end within which the extremity of the arm has thrust engagement, a semi-spherical seat in the closed terminal of the bore, being a ball head stem on the supported article, the head of which is engageable in the seat for universal rocking and rotary motion, a keyhole slot intersecting the bore in the socket member in a diagonal direction to the axis thereof, the eye of the keyhole slot being sufficiently large to admit the ball head of the supported article stem into the terminal semi-spherical seat of the bore and the elongation of the keyhole slot being of sufficient size to permit to and fro swinging and rotary motion of the supported article stem therein, the end of the arm having thrust engagement within the bore with the ball head of the stem, a shoulder on the arm in registry with the eye of the keyhole slot when the end of the arm is in engagement with the ball head of the stem, a screw plug screw threaded within the eye of the keyhole slot and having thrust engagement with the shoulder of the arm to urge the arm into clamping engagement with the ball head of the stem to hold supported the article to which the stem is attached in adjusted relation.

5. In a mounting of the character described wherein an article is mounted upon a supporting arm for universal adjustment, a clamp head at the other end thereof engageable with a support, said clamp head including a cross arm carried by the arm in offset relation therewith for hook engagement with a support, a sleeve mounted on the arm for adjustment axially thereof toward and from the cross arm and including a terminal bearing face opposing the cross arm, a reduced neck portion of the arm within the sleeve, thrust shoulders formed at opposite terminals of the reduced neck portion, a screw threaded nut, parallel spaced flanges on the nut straddling the reduced neck portion of the arm intermediate the thrust shoulders, and an adjusting screw in the sleeve and engaging the nut to effect relative adjustment of the sleeve on the arm into clamping engagement of its terminal bearing face with a supporting member interposed between said bearing face and the cross arm.

6. In a mounting of the character described, an outrigger arm supporting an article to be mounted, a laterally extending terminal portion at the opposite end of the arm engageable beyond a supporting structure, a sleeve mounted on the arm for axial adjustment to and from the laterally extending terminal portion, including a bearing face opposing the laterally extending terminal portion for clamping engagement with a supporting structure interposed therebetween, and an adjusting screw in the sleeve in laterally offset relation with the arm and having thrust engagement therewith interiorly of the sleeve for relatively adjusting the sleeve and arm into and out of clamping engagement with the interposed supporting structure.

7. In a mounting of the character described, an outrigger arm for supporting an article to be mounted, a substantially hook-shaped terminal on said arm engageable with a supporting structure, a sleeve mounted on the arm for adjustment axially thereof into clamping engagement with a supporting structure interposed between the sleeve and hook-shaped terminal, and an adjusting screw in said sleeve in offset relation with the arm and having push-pull connection therewith for relatively adjusting the sleeve and arm to effect clamping engagement of the supporting structure intermediate the hook-shaped terminal and the sleeve.

8. In a mounting of the character described, an outrigger arm for supporting an article to be mounted, a substantially hook-shaped terminal on said arm engageable with a supporting structure, a sleeve mounted on the arm for adjustment axially thereof into clamping engagement with a supporting structure interposed between the sleeve and hook-shaped terminal, and an adjusting screw in said sleeve in offset relation with the arm, and a coupling member interconnecting the screw and arm for relative adjustment of the sleeve and arm to effect clamping engagement of a support intermediate the hook-shaped terminal and sleeve.

9. In a mount of the character described, an outrigger arm for supporting an article to be mounted, a terminal therefor extending in a plane transversely of the axis of the arm for engagement with a support, a clamp sleeve having an eccentric bore therein through which the arm extends and axially adjustable upon the arm, a bearing face upon the sleeve disposed in eccentric relation at one side only of the arm and in opposing relation to the support engaging terminal, and screw means for relatively adjusting the arm and eccentrically disposed sleeve axially of the arm to clamp a support intermediate the bearing face and the terminal.

10. In a mount of the character described, an outrigger arm for supporting an article to be mounted, a terminal therefor extending in a plane transversely of the axis of the arm for engagement with a support, a clamp sleeve having an eccentric bore therein through which the arm extends and axially adjustable upon the arm, a bearing face upon the sleeve disposed in eccentric relation at one side only of the arm and in opposing relation to the support engaging terminal, a slot in the sleeve intersecting the bore, and a revoluble collar positioned in said slot and having screw threaded engagement with the arm for relatively adjusting the arm and sleeve axially of the arm to clamp a support intermediate the bearing face and the terminal.

11. An article to be mounted for universal adjustment, a ball head stem carried thereby, a supporting arm, a socket fitting having a bore therein closed at one end within which the end of the arm projects for relative adjustment of the arm and fitting rotatively and axially of the arm, said socket fitting having a keyhole slot therein diagonally intersecting the bore of the fitting, through the eye of which the ball head of the article stem is introduced into the bore, a seat in the closed end of the bore for the ball head of the article stem, a shoulder on the arm in aligned relation with the eye of the keyhole slot, and a screw plug in the eye of the keyhole slot engaging the shoulder on the arm to effect thrust engagement of the arm with the ball head of the stem seated in the end of the bore in said fitting.

GEORGE E. PETERS.
LINUS E. RUSSELL.